United States Patent [19]
Rowe et al.

[11] Patent Number: 4,761,031
[45] Date of Patent: Aug. 2, 1988

[54] FLATBED SEMI-TRAILER VEHICLE

[75] Inventors: John C. Rowe, Otterbein; Floyd D. Melchi, Remington, both of Ind.

[73] Assignee: Truck Trailer Design, Inc., Remington, Ind.

[21] Appl. No.: 53,257

[22] Filed: May 22, 1987

[51] Int. Cl.⁴ .............................................. B62D 33/02
[52] U.S. Cl. ..................................... 296/182; 296/204
[58] Field of Search ............... 296/204, 203, 181, 182; 414/498; 105/422

[56] References Cited

U.S. PATENT DOCUMENTS

| | | | |
|---|---|---|---|
| 4,226,465 | 10/1980 | McCullough | 296/204 |
| 4,526,418 | 7/1985 | Martin | 296/204 |
| 4,564,233 | 1/1986 | Booher | 296/204 |
| 4,645,258 | 2/1987 | Ohmura | 296/204 |

FOREIGN PATENT DOCUMENTS 416451 9/1934 United Kingdom .

Primary Examiner—Robert R. Song
Attorney, Agent, or Firm—Trexler, Bushnell, Giangiorgi & Blackstone, Ltd.

[57] ABSTRACT

A lightweight, flatbed semi-trailer vehicle constructed entirely of lightweight, high-strength structural members and capable of being utilized in conjunction with a truck tractor. The vehicle comprises of at least two longitudinal spaced apart support members, and a plurality of transverse support members bolted to the upper surfaces of the longitudinal support members. A stress plate provides structural rigidity to the design and serves as a second means of interconnecting the longitudinal support members.

7 Claims, 2 Drawing Sheets

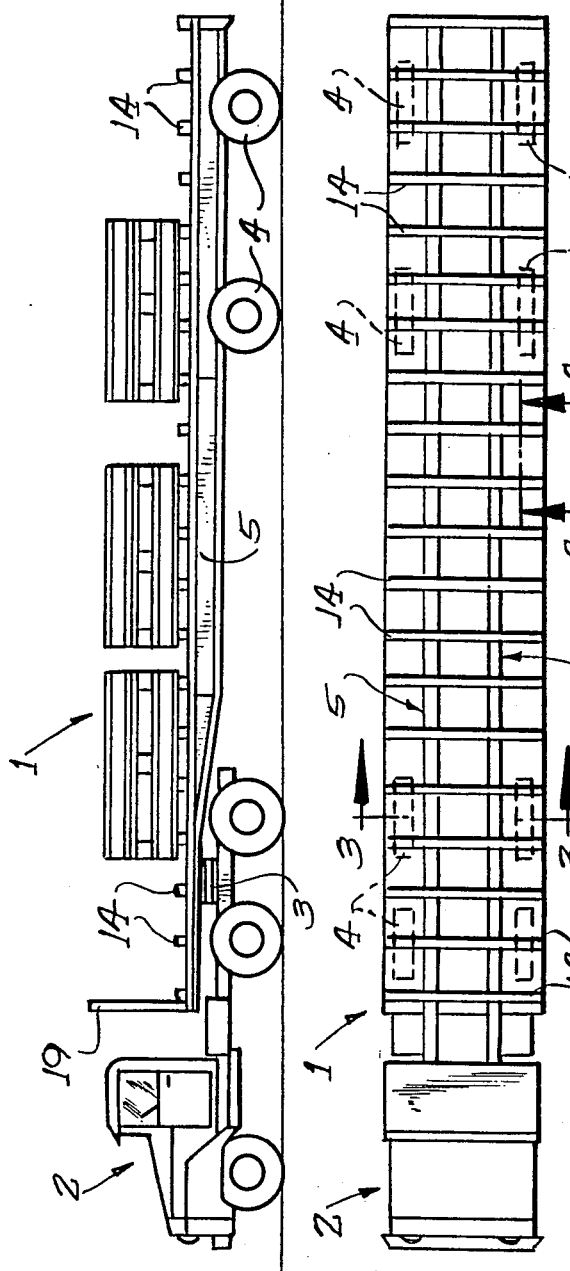
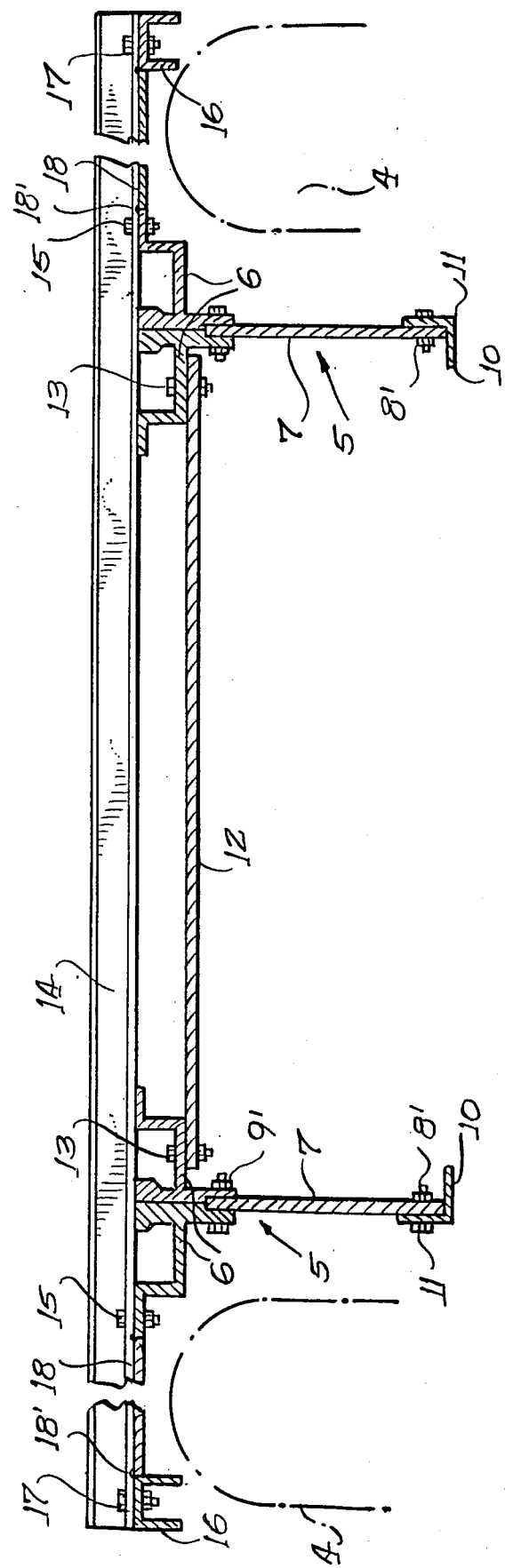

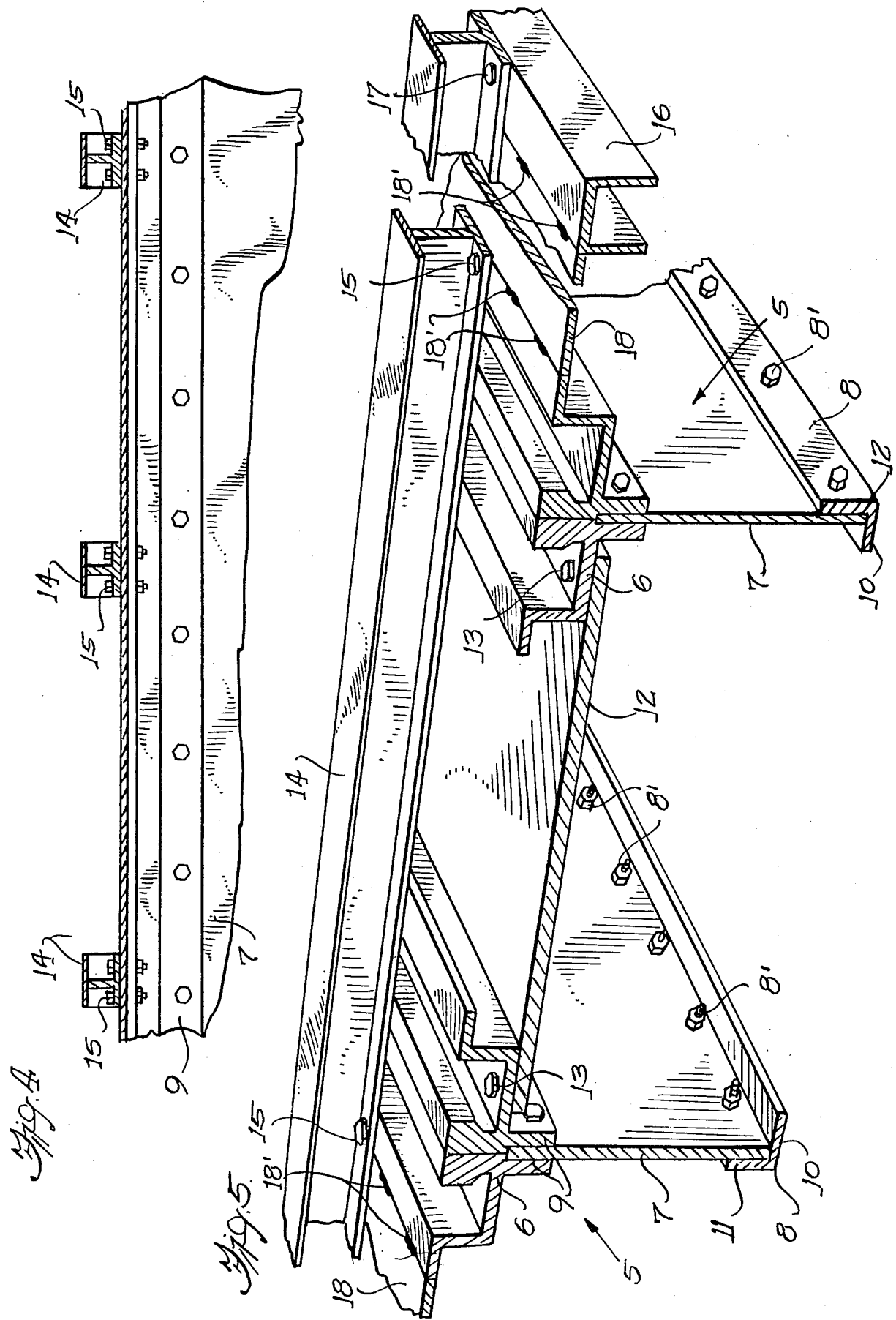

FLATBED SEMI-TRAILER VEHICLE

BACKGROUND OF THE INVENTION

This invention relates to a vehicle used for transporting freight loads, commonly referred to as a semi-trailer.

For purposes of highway shipment, unit loads of wall board, lumber and the like are routinely placed on a flatbed semi-trailer which in turn is attached to, and supported by a fifth wheel device on a modern truck tractor.

Currently semi-trailers of the type referred to are primarily constructed of longitudinal and transverse steel support members, attached to and covered by heavy gauge sheet metal flooring or decking sections, resulting in a platform like upper surface upon which the unit loads of freight are loaded.

Normally semi-trailers are loaded by utilizing standard motorized forklift trucks. This loading procedure requires dunnage to be placed between the underside of each unit freight load and the flatbed semi-trailer upper surface, as well as between each subsequent layer of freight. This dunnage allows for space in which the forklike projections of a forklift truck can be maneuvered during loading and unloading operations, as well as providing support for the unit freight loads during transport.

The result of the above-described standard semi-trailer construction, combined with the significant amounts of dunnage normally required to properly load a standard 40 foot semi-trailer with freight, is a highway vehicle normally having an overall weight in excess of 15 tons, not including the weight of the commodity to be transported.

The fuel expense associated with the operation of such a semi-trailer/truck tractor in addition to the state and federal restrictions on highway vehicle weight have long since created need for a practical transport vehicle designed to allocate only the minimum amount of weight necessary to the actual vehicle structure itself and any dunnage required, thus allowing for a maximum amount of freight capacity.

One prior attempt at overall weight reduction design suggested dividing the standard 40 foot length of a semi-trailer into two equal sections, joined together and supported by another series of wheels at the 20 foot point. This design reduced the load requirements of the individual support members and therefore allowed for the use of lighter weight support beams. However, maneuverability of this design proved problematical and positioning the freight to achieve proper weight distribution made loading procedures difficult and time consuming.

SUMMARY OF THE INVENTION

An important object of this invention is to provide a unique, lightweight, flatbed semi-trailer vehicle enabling increased load capacities.

A further object of this invention is to provide a novel semi-trailer vehicle constructed so as to reduce its weight and also for minimizing the amount of dunnage required.

Still another object of this invention is to provide a novel vehicle of the above-described type which may be quickly and easily maneuvered and loaded in accordance with standard loading procedures To attain this object, a semi-trailer vehicle according to the invention comprises a pair of longitudinal aluminum support beams, spaced apart in parallel relationship, and extending forward from the rear of the semi-trailer to a front wall positioned perpendicular to said supports. Further, said aluminum longitudinal support beams are joined together by series of shorter, aluminum, transverse cross-beams such that said transverse beams are normal to and joined to the upper surface of the longitudinal support beams.

A rectangular longitudinal stress plate, equal in length to said longitudinal support beams, provides a second means of interconnection between the two longitudinal support beams at a point below the plurality of transversely mounted cross-beams.

This inventive arrangement allows the series of transverse cross-beams to function not only as structural support members, but also as the lowest tier of dunnage, while additionally eliminating the need for metal or other flooring sections normally included in standard semi-trailer designs.

As a consequence of this innovative semi-trailer vehicle, standard load support characteristics and vehicle maneuverability remain constant, yet vehicle weight is significantly decreased and the need for an entire level of dunnage is eliminated. This significant reduction in weight permits the transport of heavier freight loads and saves expensive fuel dollars.

Other objects and advantages will become apparent from the attached detailed description and upon reference to the drawings.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is a side view showing the preferred embodiment of the present invention when coupled to a truck tractor and having a representative load of freight positioned upon the inventive semi-trailer vehicle;

FIG. 2 is a plan view of the semi-trailer vehicle and truck tractor shown in FIG. 1;

FIG. 3 is an enlarged fragmentary cross-sectional view taken substantially in the plane of line 3—3 in FIG. 2;

FIG. 4 is an enlarged fragmentary sectional view taken substantially in the plane of line 4—4 in FIG. 2; and FIG. 5 is an enlarged fragmentary perspective cross-sectional view of the semi-trailer vehicle taken substantially in the plane of line 3—3 of FIG. 2.

DETAILED DESCRIPTION OF THE ILLUSTRATED EMBODIMENT

Referring now to FIGS. 1 and 2, there is shown a flatbed semi-trailer vehicle 1, which, near its leading edge is pivotally attached to and supported by a truck tractor 2 by well known means utilizing a fifth wheel device 3. The trailing portion of the semi-trailer vehicle 1 is provided with at least one set of wheels 4 mounted in a conventional, well known manner, said wheels providing support for and allowing mobility of the semi-trailer vehicle 1.

FIG. 2 shows the innovative semi-trailer vehicle 1 which comprises at least two longitudinal support beams 5 which serve as force transmission members for the weight loads associated with the remaining vehicle components and freight loads to be carried by the semi-trailer vehicle 1. Preferably, the beams 5 are made from aluminum in the manner described in detail below to maximize weight reduction, but other suitable materials may also be used.

As best seen in FIG. 5, each longitudinal aluminum support beam 5 is comprised of at least four individual components, the upper portion being made up of a set of partially opened-channel shaped aluminum members 6, the central section comprising a flat plate-like aluminum member 7, and the lower edge being an L-shaped aluminum channel 8, each individual component extending the entire length of the semi-trailer vehicle 1. In the present form of the invention, the upper partially opened-channel shaped members 6 are joined in parallel relationship with one another and have a lower flanged portion 9 shaped to accommodate the upper edge of the central plate leg member 7, which is sandwiched and fastened by bolts 9' between the two partially opened channeled members 6 and extends downward therefrom. The L-shaped aluminum channel member 8 engages the lower edge of the central plate-like member 7 and is secured thereto by bolts 8' in a manner such that a horizontal leg 10 thereof covers the bottom edge of the plate-like member 7 and a verticle leg 11 thereof remains flush with the outer surface of the plate-like member 7 with respect to the longitudinal center axis of semi-trailer vehicle 1.

In accordance with a further aspect of the invention, the plate-like central member 7 of longitudinal aluminum support beam 5 can be gradually reduced in cross-sectional height to facilitate proper connection between the semi-trailer vehicle 1 and the truck tractor 2 near the forward end of the semi-trailer vehicle 1 as illustrated in FIG. 1.

As shown in FIG. 3, provision is made for interconnecting the longitudinal aluminum support beams 5 by means of a stress plate 12 positioned horizontally between the two intermost partially opened channel shaped members 6 of the longitudinal aluminum support beams 5 and fixedly attached thereto by a plurality of bolts 13. The stress plate 12, preferably extends the entire length of the semi-trailer vehicle 1 and, in the preferred embodiment of the invention, is formed of aluminum approximately 30" wide, and at least 3/16 of an inch thick. The stress plate 12 is positioned to distribute stresses encountered equally between its longitudinal and transverse directions. In this way the stress plate 12 will prevent distortion of the longitudinal aluminum support beams 5 while the semi-trailer vehicle 1 is in motion, and especially as it is negotiated about roadway curves and corners.

In keeping with one of the principle objects of the inventive semi-trailer vehicle 1, and as best seen in FIG. 5, a series of aluminum cross-beams 14 is provided, which cross-beams extend across and are bolted to the upper surface of longitudinal support beams 5 such that a perpendicular relationship is maintained between each aluminum cross-beam 14 and each longitudinal support beam 5. The aluminum cross-beams 14 are of rectangular cross-section and once in position, extend a predetermined distance beyond the outer surfaces of longitudinal support beams 5 and preferably for the full width of the trailer. Additionally, bolts 15 serve to fix said aluminum cross-beams to the logitudinal beams in a predetermined spaced relationship with one another.

It is of importance that the aluminum cross-beams 14 are spaced apart such that a standard forklift truck is able to conduct loading and unloading procedures utilizing the aluminum cross-beams 14 in a manner identical to that in which the lowermost layer or dunnage is utilized on a conventional flatbed semi-trailer vehicle. It is therefore apparent that the aluminum cross-beams 14 function not only as standard load distribution members in the innovative semi-trailer vehicle 1, but that they also eliminate the cost and need for the lowermost level of dunnage and consequently reduce the overall weight of a loaded semi-trailer/tractor rig in significant amount. Attention is drawn to the fact that the aforementioned structure results in a weight reduction of approximately 3,000 pounds as compared with a standard semi-trailer design and that the normal amount of dunnage required on a standard 40 foot long semi-trailer load can range in weight from 1,500 to 5,000 pounds. Therefore, without increasing loading time or hampering maneuverability, the innovative semi-trailer design effectively reduces overall weight allowing for transport of heavier loads within the normal 80,000 pound highway vehicle weight limit. It is evident that such an improved semi-trailer design results in increased shipment efficiency and a reduction of associated costs.

In still another aspect of the invention, as best seen in FIGS. 3 and 5, the distal ends of each cross-beam member 14 are joined together on both sides of the semi-trailer vehicle 1 by means of an aluminum U-shaped rub rail 16, the rub rail 16 opening downwardly and extending the entire length of each side of the semi-trailer vehicle 1. In the preferred embodiment of the invention, the upper surface of rub rail 16 is bolted to the lower surface of each cross-beam 14, utilizing a plurality of fasteners 17. The rub rails 16 provide structural rigidity and preventing foreign objects from coming into contact with the freight loads being carried.

As a further aspect of the invention, thin aluminum sheets form splash guards 18 which are tack-welded as at 18' between the opposing surfaces of each rub rail 16 and each longitudinal support beam 5. The sheets 18 extend horizontally the entire length of the semi-trailer 1 at a level equal to that of the uppermost surface of each rub rail 16. The splash guards 18 provide a barrier against water and debris on the roadway which otherwise could be splashed up onto the freight load as a result of tire rotation during vehicle operation.

While the invention has been described in connection with a preferred embodiment, it will be understood that it is not intended to limit the invention thereto, but rather to cover all modifications and alternative constructions falling within the spirit and scope of the invention as expressed in the appended claims.

The invention is claimed as follows:

1. A flatbed vehicle comprising longitudinally extending load bearing support frame means and a series of at least two cross support members extending transversely of and supported above said support frame means and extending substantially the entire width of the vehicle for receiving and supporting freight loads, said vehicle being free of any decking or the like overlying said cross support members.

2. The flatbed vehicle according to claim 1, wherein said support frame means comprises at least two spaced apart longitudinal support members extending substantially the length of the vehicle, and a longitudinal stress plate positioned between and fixedly attached to said longitudinal support members, thereby providing structural rigidity and strength to the underlying support frame means.

3. The flatbed vehicle of claim 1, wherein said vehicle further comprises two longitudinal downwardly open U-shaped rub rails extending substantially the length of the vehicle and fixedly attached to lower surfaces of ends of each cross support member and spaced outwardly from said frame means such that one rub rail member is located on each side of the vehicle.

4. The flatbed vehicle of claim 3 wherein said vehicle further comprises longitudinal sheet members beneath said cross support members and fixedly attached between said longitudinal support means and each longitudinal rub rail and functioning as barriers against water and debris on the roadway which otherwise could be splashed onto the freight loads being carried by the vehicle.

5. A flatbed vehicle comprising longitudinally extending load bearing support frame means and a series of spaced transversely extending load support members supported above said support frame means for receiving and supporting freight loads, said vehicle being free from any decking or the like overlying said spaced transversely extending load support members.

6. The flatbed vehicle according to claim 5, wherein said spaced transversely extending load support members include discrete frame members secured on top of said frame means and including portions extending laterally of the frame means substantially to opposite side margins of the vehicle.

7. The flatbed vehicle according to claim 6, wherein said support frame means comprises at least two spaced longitudinal support members extending substantially the length of the vehicle, a longitudinal stress plate beneath outer ends of transversely extending load support member portions and extending longitudinally substantially the length of said vehicle and logngitudinal sheet members beneath said frame members and fixedly attached between said longitudinal support members and said rub rails.

* * * * *